(12) United States Patent
Li et al.

(10) Patent No.: US 11,881,601 B2
(45) Date of Patent: Jan. 23, 2024

(54) BOX OF BATTERY, BATTERY, POWER CONSUMPTION DEVICE, AND METHOD AND APPARATUS FOR PRODUCING BOX

(71) Applicant: CONTEMPORARY AMPEREX TECHNOLOGY CO., LIMITED, Fujian (CN)

(72) Inventors: Xianda Li, Fujian (CN); Xiaobo Chen, Fujian (CN); Lu Hu, Fujian (CN); Piaopiao Yang, Fujian (CN); Jinru Yue, Fujian (CN); Mingguang Gu, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 73 days.

(21) Appl. No.: 17/549,142

(22) Filed: Dec. 13, 2021

(65) Prior Publication Data
US 2022/0320696 A1    Oct. 6, 2022

Related U.S. Application Data

(63) Continuation of application No. PCT/CN2021/084448, filed on Mar. 31, 2021.

(51) Int. Cl.
*H01M 50/618*    (2021.01)
*H01M 50/375*    (2021.01)
(Continued)

(52) U.S. Cl.
CPC ....... *H01M 50/618* (2021.01); *H01M 50/375* (2021.01); *H01M 50/691* (2021.01); *H01M 2220/20* (2013.01)

(58) Field of Classification Search
None
See application file for complete search history.

(56) References Cited

U.S. PATENT DOCUMENTS 4,752,540 A * 6/1988 Chua ................... H01M 50/109
429/56
9,912,021 B2    3/2018 Andres
(Continued)

FOREIGN PATENT DOCUMENTS

CN    110061329 A    7/2019
CN    209071461 U    7/2019
(Continued)

OTHER PUBLICATIONS

Extended European Search Report dated Sep. 9, 2022 received in European Patent Application No. EP 21742028.0.
(Continued)

*Primary Examiner* — Lisa S Park
(74) *Attorney, Agent, or Firm* — Scully, Scott, Murphy & Presser, P.C.

(57) ABSTRACT

Embodiments of the present application provide a box of a battery. The box includes: an electrical chamber configured to accommodate a plurality of battery cells, a battery cell including a pressure relief mechanism, and the pressure relief mechanism being configured to be actuated when an internal pressure or temperature of the battery cell reaches a threshold, to relieve the internal pressure; a thermal management component configured to accommodate a fluid to adjust the temperature of the battery cell; and a collection chamber configured to collect emissions discharged from the battery cell when the pressure relief mechanism is actuated, where the electrical chamber and the collection chamber are disposed on both sides of the thermal management component, a wall of the collection chamber is provided with a first pressure relief zone, and the first pressure relief zone is configured to relieve the emissions in the collection chamber.

19 Claims, 7 Drawing Sheets

(51) Int. Cl.
  *H01M 50/691* (2021.01)
  *H01M 10/6556* (2014.01)
  *H01M 10/6567* (2014.01)

(56) References Cited

U.S. PATENT DOCUMENTS

| | | | |
|---|---|---|---|
| 11,024,901 B2 | 6/2021 | Tasiopoulos et al. | |
| 2010/0136391 A1* | 6/2010 | Prilutsky | H01M 10/6566 |
| | | | 429/62 |
| 2013/0095356 A1* | 4/2013 | Shimizu | H01M 50/519 |
| | | | 429/88 |
| 2014/0342201 A1 | 11/2014 | Andres | |
| 2019/0207184 A1 | 7/2019 | Koutari et al. | |
| 2019/0229384 A1 | 7/2019 | Tasiopoulos et al. | |
| 2021/0104801 A1 | 4/2021 | Chu et al. | |
| 2021/0328304 A1 | 10/2021 | You et al. | |

FOREIGN PATENT DOCUMENTS

| | | |
|---|---|---|
| CN | 209183609 U | 7/2019 |
| CN | 209401662 U | 9/2019 |
| CN | 111106277 A | 5/2020 |
| CN | 112018321 A | 12/2020 |
| CN | 112038528 A | 12/2020 |
| CN | 112086604 A | 12/2020 |
| CN | 112086605 A | 12/2020 |
| DE | 102017212223 A1 | 1/2019 |
| EP | 2804188 A1 | 11/2014 |
| JP | 2013509688 A | 3/2013 |
| WO | 2012017586 A1 | 2/2012 |
| WO | 2018003291 A1 | 1/2018 |

OTHER PUBLICATIONS

Notice of Reasons for Refusal dated Jul. 10, 2023 received in japanese Patent Application No. JP 2022-537169.
Notification to Grant Patent Right for Invention dated Oct. 16, 2023 received in Chinese Patent Application No. CN 202180000948.5.

* cited by examiner

BOX OF BATTERY, BATTERY, POWER CONSUMPTION DEVICE, AND METHOD AND APPARATUS FOR PRODUCING BOX

CROSS-REFERENCE TO RELATED APPLICATIONS

This application is a continuation of International Application No. PCT/CN2021/084448, filed on Mar. 31, 2021. The disclosures of the aforementioned applications are hereby incorporated by reference in their entireties.

TECHNICAL FIELD

The present application relates to the field of battery technologies, and in particular, to a box of a battery, a battery, a power consumption device, and a method and apparatus for producing a box.

BACKGROUND

Energy conservation and emission reduction are the key to the sustainable development of the automotive industry. In this case, electric vehicles have become an important component of the sustainable development of the automotive industry due to their advantages of energy conservation and environmental protection. For the electric vehicles, battery technology is an important factor for their development.

In the development of the battery technology, in addition to improving the performance of a battery, safety is also an issue that cannot be ignored. If the safety of the battery cannot be guaranteed, the battery cannot be used. Therefore, how to enhance the safety of the battery is an urgent technical problem to be solved in the battery technology.

SUMMARY

The present application provides a box of a battery, a battery, a power consumption device, and a method and apparatus for producing a box, which can enhance the safety of the battery.

In a first aspect, provided is a box of a battery, including: an electrical chamber, configured to accommodate a plurality of battery cells, a battery cell including a pressure relief mechanism, and the pressure relief mechanism being configured to be actuated when an internal pressure or temperature of the battery cell reaches a threshold, to relieve the internal pressure; a thermal management component, configured to accommodate a fluid to adjust the temperature of the battery cell; and a collection chamber, configured to collect emissions discharged from the battery cell and passing through the thermal management component when the pressure relief mechanism is actuated, where the electrical chamber and the collection chamber are disposed on both sides of the thermal management component, the thermal management component is configured to separate the electrical chamber and the collection chamber, a wall of the collection chamber is provided with a first pressure relief zone, and the first pressure relief zone is configured to relieve the emissions in the collection chamber.

Therefore, in the box of the battery in the embodiment of the present application, the first pressure relief zone is disposed on the wall of the collection chamber, so that when the pressure relief mechanism is actuated, the emissions discharged by the battery cell through the pressure relief mechanism can be discharged in time through the first pressure relief zone on the wall of the collection chamber after entering the collection chamber, to relieve the pressure and temperature in the collection chamber, thereby enhancing the safety of the battery.

In some embodiments, the thermal management component has a wall shared by the electrical chamber and the collection chamber.

In some embodiments, the box includes: a protective member, where the protective member is configured to protect the thermal management component, and the protective member and the thermal management component form the collection chamber.

In some embodiments, the protective member includes a bottom wall and a plurality of side walls to form a hollow structure with an opening at one end, and the thermal management component covers the opening to form the collection chamber.

In some embodiments, the first pressure relief zone is disposed on the plurality of side walls.

If the first pressure relief zone is disposed on the bottom wall of the protective member, the strength of the bottom wall of the protective member will be affected, and then during the use of the battery, it is not beneficial for the collision safety performance of the whole battery. Therefore, the first pressure relief zone is usually disposed on the side wall.

In some embodiments, a plurality of the first pressure relief zones are disposed on each side wall of the plurality of side walls.

The provision of the plurality of first pressure relief zones can speed up the discharge of the emissions from the collection chamber, but considering the structural strength of the protective member, it is not advisable to provide too many first pressure relief zones on each side wall.

In some embodiments, the plurality of the first pressure relief zones are uniformly arranged on the each side wall.

The first pressure relief zone is uniformly distributed on each side wall, so that the protective member can receive uniform force during use, and the structural strength of the protective member will not be affected due to the fact that the local strength of the protective member is too weak.

In some embodiments, a first through hole is disposed on the protective member, and the first pressure relief zone includes the first through hole.

The first pressure relief zone is set as a through hole, so that the emissions that enter the collection chamber can be quickly discharged through the through hole, which speeds up the discharge speed.

In some embodiments, a first weakened zone is disposed on the protective member, the first weakened zone is configured to be damaged by the emissions in the collection chamber when the pressure relief mechanism is actuated, so that the emissions are discharged from the collection chamber, and the first pressure relief zone includes the first weakened zone.

Compared with setting the first pressure relief zone as the first through hole, setting the first pressure relief zone as the first weakened zone can ensure that the collection chamber remains a relatively sealed state with the outside of the battery when the battery cells are normal and no thermal runaway occurs, thereby preventing external water vapor and dust from negatively affecting the use of the battery.

In some embodiments, a melting point of a material of the first weakened zone is lower than a melting point of a material of another region on the protective member other than the first weakened zone.

A temperature-sensitive material is adopted to set the first weakened zone so that when the pressure relief mechanism is actuated, the first weakened zone can still be damaged even when the pressure in the collection chamber is low, and thus the emissions from the battery cells can be discharged in time.

In some embodiments, a melting point of a material of the first weakened zone is less than or equal to 200° C.

Considering the thermal runaway of the battery cell, the discharged emissions can usually reach a temperature between 400° C. and 800° C., and after passing through the thermal management component, the high-temperature emissions can reach a temperature between 200° C. and 400° C. when reaching the protective member. In order to enable the emissions reaching the protective member to melt the first weakened zone, the melting point of the material of the first weakened zone may be set to be less than or equal to 200° C.

In some embodiments, the first weakened zone is disposed on the plurality of side walls, and wall thicknesses of the plurality of side walls at the first weakened zone are equal to wall thicknesses of the plurality of side walls at another region, so as to ensure the structural strength of the side walls.

In some embodiments, the first weakened zone includes an indentation on the protective member.

In some embodiments, a second pressure relief zone is disposed on the thermal management component so that when the pressure relief mechanism is actuated, the emissions discharged from the battery cell are capable of passing through the second pressure relief zone and being discharged to the collection chamber.

In some embodiments, the second pressure relief zone is arranged opposite to the pressure relief mechanism.

In this way, when the pressure relief mechanism is actuated, the discharged emissions can be directly discharged from the electrical chamber through the second pressure relief zone.

In some embodiments, a flow channel is disposed on the thermal management component, and the flow channel is configured to accommodate the fluid and be damaged by the emissions discharged from the battery cell when the pressure relief mechanism is actuated, so that the fluid is discharged from the inside of the flow channel.

In some embodiments, a second weakened zone is disposed on a wall of the flow channel, so that when the pressure relief mechanism is actuated, the flow channel is damaged at the second weakened zone. In this way, the fluid in the flow channel can be directly discharged, thereby reducing the temperature of the emissions.

In some embodiments, the thermal management component includes a first thermally conductive plate and a second thermally conductive plate, the first thermally conductive plate is located between a first wall and the second thermally conductive plate and attached to the first wall, the first wall is a wall of the battery cell provided with the pressure relief mechanism, the first thermally conductive plate is adhered to the second thermally conductive plate, the second thermally conductive plate has a first groove with an opening facing the first thermally conductive plate, and the first groove and the first thermally conductive plate form the flow channel.

In some embodiments, the second weakened zone is located on a side wall or a bottom wall of the first groove.

In some embodiments, the second pressure relief zone is a second through hole on the thermal management component.

The second pressure relief zone is set as a second through hole, so that the emissions discharged from the pressure relief mechanism can be quickly discharged to the collection chamber through the second through hole.

In some embodiments, the second weakened zone is disposed on a side wall of the second through hole.

A hole wall of the second through hole is a wall of the flow channel, so that when the emissions pass through the second through hole, the second weakened zone can be damaged, and further, the fluid in the flow channel is discharged to reduce the temperature of the emissions.

In some embodiments, the second pressure relief zone is a second groove on the thermal management component that is arranged opposite to the pressure relief mechanism, a bottom wall of the second groove is configured to be damaged by the emissions discharged from the battery cell when the pressure relief mechanism is actuated, so as to discharge the emissions discharged from the battery cell to the collection chamber.

The second pressure relief zone is set as a groove, so that when the battery cell suffers from thermal runaway, the pressure relief mechanism has enough space to relieve the pressure, and when the battery cell is working normally, the electrical chamber and the collection chamber are not in communication with each other, and the electrical chamber will not be affected by the collection chamber.

In some embodiments, a radial size of the second groove gradually decreases in a direction away from the pressure relief mechanism.

Such a change in a hole diameter of the second groove can increase an area of a hole wall of the second groove, which also increases a contact area between the emissions discharged from the battery cell through the pressure relief mechanism and the hole wall of the second groove, and can reduce the temperature of more emissions; in addition, more emissions contact the hole wall of the second groove, which can also enable the hole wall of the second groove to be more easily damaged by the emissions, especially when the hole wall of the second groove serves as the wall of the flow channel, the side wall of the second groove is damaged, so that the internal fluid can flow out quickly and reduce the temperature of the emissions.

In some embodiments, the first thermally conductive plate is recessed toward the second thermally conductive plate in the second pressure relief zone to form the second groove.

In some embodiments, the second groove is disposed in the first groove so that the flow channel is formed between the side wall of the first groove and a side wall of the second groove.

In some embodiments, the second weakened zone is disposed on a side wall of the second groove.

That is, the side wall of the second groove is the wall of the flow channel When the emissions damage the bottom wall of the second groove and enter the collection chamber, they will also damage the second weakened zone on the side wall of the second groove, so that the fluid in the flow channel flows out, thereby reducing the temperature of the emissions.

In some embodiments, a melting point of a material of the second weakened zone is lower than a melting point of a material of another region on the flow channel other than the second weakened zone.

In some embodiments, a melting point of a material of the second weakened zone is less than or equal to 400° C.

Considering that when the battery cell suffers from thermal runaway, the discharged emissions can usually reach a temperature between 400° C. and 800° C., the material of the second weakened zone can thus be selected from a material with a melting point less than or equal to 400° C.

In some embodiments, a wall thickness of the flow channel at the second weakened zone is equal to a wall thickness of the flow channel at another region of the flow channel, so as to ensure the strength of the flow channel on the thermal management component.

In some embodiments, a melting point of a material of the second weakened zone is smaller than a melting point of a material of the first weakened zone.

Considering that after the emissions are discharged from the pressure relief mechanism, they first contact the thermal management component, the melting point of the material of the second weakened zone on the thermal management component can thus be set to be higher, which can also avoid excessive weakness of the thermal management component; and when the emissions enter the collection chamber through the thermal management component, since the thermal management component has already reduced the temperature of the emissions, the emissions cool down quickly, and the melting point of the material of the first weakened zone on the collection chamber can be set to be lower. As a result, the first weakened zone can be quickly melted, and the emissions can be discharged out of the collection chamber.

In some embodiments, the box further includes a covering, the covering is a hollow structure with an opening at one end, and the thermal management component covers the opening of the covering to form the electrical chamber.

In a second aspect, provided is a battery, including: a plurality of battery cells, at least one battery cell of the plurality of battery cells including a pressure relief mechanism, and the pressure relief mechanism being configured to be actuated when an internal pressure or temperature of the battery cell provided with the pressure relief mechanism reaches a threshold, to relieve the internal pressure; and the box of the battery in the first aspect, the box being configured to accommodate the plurality of battery cells.

In a third aspect, provided is a power consumption device, including: the battery in the second aspect, the battery being configured to provide electrical energy.

In some embodiments, the power consumption device is a vehicle, a ship or a spacecraft.

In a fourth aspect, provided is a method for producing a box of a battery, including: providing an electrical chamber, the electrical chamber being configured to accommodate a plurality of battery cells, a battery cell including a pressure relief mechanism, and the pressure relief mechanism being configured to be actuated when an internal pressure or temperature of the battery cell reaches a threshold, to relieve the internal pressure; providing a thermal management component, the thermal management component being configured to accommodate a fluid to adjust the temperature of the battery cell; and providing a collection chamber, the collection chamber being configured to collect emissions discharged from the battery cell and passing through the thermal management component when the pressure relief mechanism is actuated, where the electrical chamber and the collection chamber are disposed on both sides of the thermal management component, the thermal management component is configured to separate the electrical chamber and the collection chamber, a wall of the collection chamber is provided with a first pressure relief zone, and the first pressure relief zone is configured to relieve the emissions in the collection chamber.

In a fifth aspect, provided is an apparatus for producing a box of a battery, including: a module for executing the above method in the fourth aspect.

Figure 1:
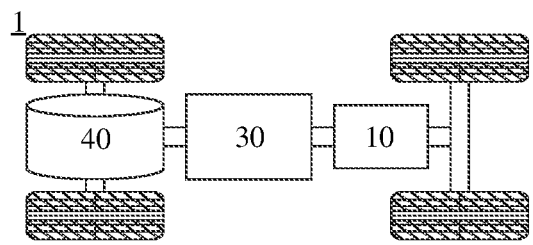
FIG. 1 is a schematic structural diagram of a vehicle disclosed in an embodiment of present application.

In the drawings, the drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise provided, "a plurality of" means more than two (including two); and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as limitation to the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms "installation", "interconnection", "connection" and "attachment" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the present application, a battery cell may include a primary battery, a secondary battery, such as a lithium-ion battery, a lithium-sulfur battery, a sodium/lithium-ion battery, a sodium-ion battery or a magnesium-ion battery, which is not limited in the embodiments of the present application. The battery cell may be cylindrical, flat, cuboid or in another shape, which is also not limited in the embodiments of the present application. The battery cell is generally divided into three types according to the way of packaging: a cylindrical battery cell, a square battery cell and a pouch battery cell, which is also not limited in the embodiments of the present application.

The battery mentioned in the embodiment of the present application refers to a single physical module that includes one or more battery cells to provide a higher voltage and capacity. For example, the battery mentioned in the present application may include a battery module or a battery pack. The battery pack generally includes a box for encapsulating one or more battery cells. The box can prevent liquid or other foreign matters from affecting the charging or discharging of the battery cell.

The battery cell includes an electrode assembly and an electrolytic solution, and the electrode assembly includes a positive electrode sheet, a negative electrode sheet and a separator. The operation of a battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, and a current collector not coated with the positive electrode active material layer protrudes from the current collector coated with the positive electrode active material layer and serves as a positive tab. In an example of a lithium-ion battery, a material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, and a current collector not coated with the negative electrode active material layer protrudes from the current collector coated with the negative electrode active material layer and serves as a negative tab. A material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. A material of the separator may be PP, PE, or the like. In addition, the electrode assembly may be a winding structure or a laminated structure, and the embodiments of the present application are not limited thereto. With the development of the battery technology, it is necessary to consider design factors in multiple aspects simultaneously, such as energy density, cycle life, discharge capacity, C-rate and other performance parameters. In addition, safety of the battery should also be considered.

For a battery, a main safety hazard comes from the charging and discharging process, and in order to improve safety performance of the battery, a battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design requirements. The predetermined threshold may depend on the material of one or more of the positive electrode sheet, the negative electrode sheet, the electrolytic solution and the separator in the battery cell. The pressure relief mechanism may adopt, for example, a pressure-sensitive or temperature-sensitive element or component. That is, when the internal pressure or temperature of the battery cell reaches a predetermined threshold, the pressure relief mechanism is actuated, so as to form a channel for relieving the internal pressure or temperature.

The "actuated" mentioned in the present application means that the pressure relief mechanism generates an action, so that the internal pressure and temperature of the battery cell can be relieved. The action generated by the pressure relief mechanism may include but be not limited to: at least a portion of the pressure relief mechanism being fractured, torn or melted, and so on. After the pressure relief mechanism is actuated, high-temperature and high-pressure substances inside the battery cell will be discharged outwards from the pressure relief mechanism as emissions. In this way, the pressure of the battery cell can be relieved at a controllable pressure or temperature, thereby avoiding potentially more serious accidents.

The emissions from the battery cell mentioned in the present application include but are not limited to: an electrolytic solution, a dissolved or split positive and negative electrode sheet, fragments of a separator, a high-temperature and high-pressure gas generated by reaction, flames, or the like.

The pressure relief mechanism on the battery cell has an important impact on the safety of the battery. For example, when a short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. However, in order to ensure an output voltage or current of the battery, a plurality of battery cells are often required and the plurality of battery cells are electrically connected to each other via a bus component. The emissions discharged from the inside of a battery cell may cause a short circuit of the other battery cells. For example, when discharged metal scraps are electrically connected to two bus components, the battery will be short-circuited, thereby posing a potential safety hazard. Moreover, the high-temperature and high-pressure emissions are discharged in a direction in which the pressure relief mechanism of the battery cell is disposed, and more specifically, may be discharged in a direction of a region in which the pressure relief mechanism is actuated. The strength and destructive power of such emissions may be huge, or may even be great enough to break through one or more structures in this direction, causing further safety problems.

In view of this, a battery in an embodiment of the present application may also be provided with a thermal management component, a surface of the thermal management component is attached to a surface of a battery cell where a pressure relief mechanism is disposed, and a pressure relief zone may also be disposed on the thermal management component. By using the management component, the inside of a box of the battery can be separated into an electrical chamber for accommodating the battery cell and a collection chamber for collecting emissions. When the pressure relief mechanism is actuated, the emissions from the battery cell can enter the collection chamber, thereby reducing the impact of the emissions on a bus component in the electrical chamber, and further, enhancing the safety of the battery; and since the emissions of the battery cell are collected through the collection chamber, the high-temperature and high-pressure emissions are buffered, and pressure and temperature of the emissions are reduced to some extent, thereby reducing the destructive power to other structures, and further enhancing the safety of the battery.

However, if the emissions entering the collection chamber cannot be discharged in time, thermal diffusion may be likely to be caused, and the emissions may cause other battery cells to suffer from thermal runaway as well, which in turn causes the battery to explode.

In order to solve this problem, an embodiment of the present application provides a box of a battery, the box includes an electrical chamber, a thermal management component, and a collection chamber; and a first pressure relief zone is disposed on the collection chamber, and the first pressure relief zone is configured to relieve emissions in the collection chamber, so that the emissions can be discharged from the collection chamber in time, thereby relieving pressure and temperature in the collection chamber, and preventing explosion.

It should be understood that the thermal management component in the embodiment of the present application may be configured to accommodate a fluid to adjust the temperature of a plurality of battery cells. The fluid here may be a liquid or a gas, and the temperature adjustment means heating or cooling the plurality of battery cells. In a case of cooling or lowering the temperature of the battery cells, the thermal management component is configured to accommodate a cooling fluid to lower the temperature of the plurality of battery cells. In this case, the thermal management component may also be called a cooling component, a cooling system, a cooling plate, or the like. The fluid accommodated therein may also be called a cooling medium or a cooling fluid, and more specifically, may be called a cooling liquid or a cooling gas. In addition, the thermal management component may also be configured for heating to raise the temperature of the plurality of battery cells, which is not limited in the embodiment of the present application. Optionally, the fluid may flow in a circulating manner to achieve a better temperature adjustment effect. Optionally, the fluid may be water, a mixture of water and ethylene glycol, air, or the like.

In addition, when the pressure relief mechanism is actuated, the emissions discharged from the battery cell can be discharged through a pressure relief zone of the thermal management component, and the thermal management component can also lower the temperature of the battery cell to avoid the battery cell from exploding.

The electrical chamber in the embodiment of the present application may be configured to accommodate a plurality of battery cells, and may also be configured to accommodate a bus component. The electrical chamber may be sealed or unsealed. The electrical chamber provides an installation space for the battery cells and the bus component. In some embodiments, a structure configured to fix the battery cells may also be disposed in the electrical chamber. The shape of the electrical chamber may be determined according to the plurality of battery cells and the bus component accommodated. In some embodiments, the electrical chamber may be a cube with six walls. Since the battery cells in the electrical chamber form higher voltage output through electrical connection, the electrical chamber may also be called a "high-voltage chamber".

The bus component is configured to implement electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Analogous to the "high-voltage chamber", the electrical connection formed by the bus component may also be called "high-voltage connection".

The collection chamber in the embodiment of the present application is configured to collect the emissions, and may be sealed or non-sealed. In some embodiments, the collection chamber may contain air or another gas. In the collection chamber, there is no electrical connection to the voltage output. Corresponding to the "high-voltage chamber", the collection chamber may also be called a "low-voltage chamber". Optionally, or additionally, the collection chamber may also contain a liquid, such as a cooling medium, or is provided with a component for accommodating the liquid so as to further lower the temperature of the emissions entering the collection chamber. Further, optionally, the gas or liquid in the collection chamber flows in a circulating manner.

Technical solutions described in embodiments of the present application are all applicable to various apparatuses using batteries, such as mobile phones, portable devices, notebook computers, electromobiles, electronic toys, electric tools, electric vehicles, ships and spacecrafts. For example, the spacecrafts include airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be disposed at the bottom, head or tail of the vehicle 1. The battery 10 may be used for power supply of the vehicle 1. For example, the battery 10 may serve as an operation power source of the vehicle 1 for a circuit system of the vehicle 1, for example, for a working power demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide driving power for the vehicle 1.

In order to meet different power demands, the battery 10 may include a plurality of battery cells 20, where the plurality of battery cells 20 may be in series connection, parallel connection or series-parallel connection. The series-parallel connection refers to a combination of series connection and parallel connection. The battery 10 may also be referred to as a battery pack. Optionally, the plurality of battery cells 20 may be first connected in series, in parallel, or in series and parallel to constitute a battery module 200, and then the plurality of battery modules 200 are connected in series, in parallel, or in series and parallel to constitute the battery 10. That is, the plurality of battery cells 20 may directly constitute the battery 10, or may first constitute the battery module 200, and then the battery modules 200 constitute the battery 10.

Figure 2:
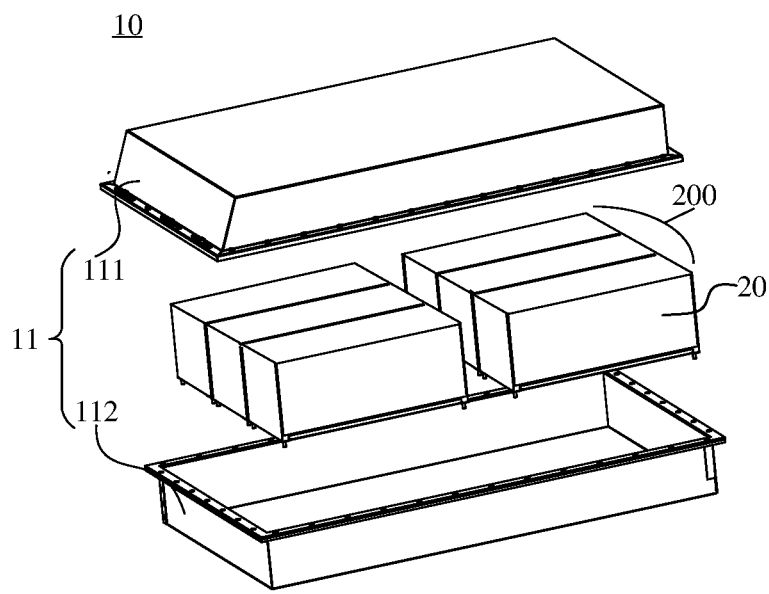
FIG. 2 is a schematic diagram of an exploded structure of a battery disclosed in an embodiment of the present application.

For example, as shown in FIG. 2, FIG. 2 is a schematic structural diagram of a battery 10 according to an embodiment of the present application, and the battery 10 may include at least one battery module 200. The battery module 200 includes a plurality of battery cells 20. The battery 10 may further include a box 11 with the inside thereof being a hollow structure, and the plurality of battery cells 10 are accommodated in the box 11. As shown in FIG. 2, the box may include two portions, which are referred to as a first portion 111 and a second portion 112, respectively, and the first portion 111 and the second portion 112 are fastened together. Shapes of the first portion 111 and the second portion 112 may be determined according to a combined shape of battery modules 200, and at least one of the first portion 111 and the second portion 112 has one opening. For example, as shown in FIG. 2, the first portion 111 and the second portion 112 each may be a hollow cuboid and each have only one surface as an opening surface, an opening of the first portion 111 is arranged opposite to an opening of the second portion 112, and the first portion 111 and the second portion 112 are fastened to each other to form the box 11 with a closed chamber. For another example, different from that shown in FIG. 2, only one of the first portion 111 and the second portion 112 may be a hollow cuboid with an opening, and the other may be in a plate shape to cover the opening. For example, in an example that the second portion 112 is a hollow cuboid and has only one surface as an opening surface and the first portion 111 is in a plate shape, an opening of the second portion 112 is covered by the first portion 111 to form the box 11 with a closed chamber, and the chamber may be configured to accommodate the plurality of battery cells 20. The plurality of battery cells 20 are combined in parallel connection or series connection or series-parallel connection and are then placed in the box 11 formed by fastening the first portion 111 to the second portion 112.

Optionally, the battery 10 may further include other structures, which will not be described in detail herein. For example, the battery 10 may further include a bus component. The bus component is configured to implement electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism passing through the box 11.

Figure 3:
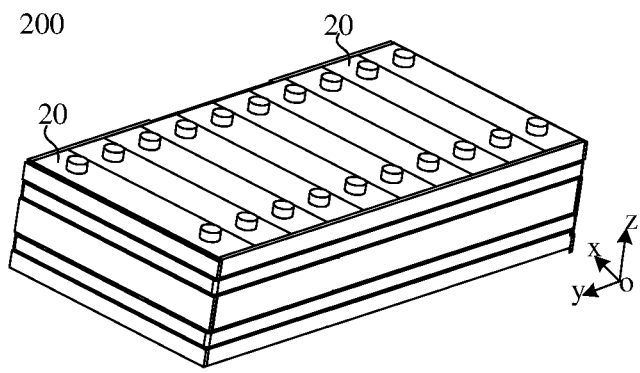
FIG. 3 is a schematic diagram of a partial structure of a battery module disclosed in an embodiment of the present application.

According to different power demands, the number of battery cells 20 in the battery module 200 may be set to any value. The plurality of battery cells 20 may be connected in series, in parallel or in series and parallel to achieve larger capacity or power. Since the number of the battery cells 20 included in each battery 10 may be large, the battery cells 20 are arranged in groups for convenience of installation, and each group of battery cells 20 constitute the battery module 200. The number of battery cells 20 included in the battery module 200 is not limited and may be set according to demands. For example, FIG. 3 is an example of a battery module 200. The battery 10 may include a plurality of battery modules 200, and these battery modules 200 may be connected in series, in parallel or in series and parallel.

Figure 4:
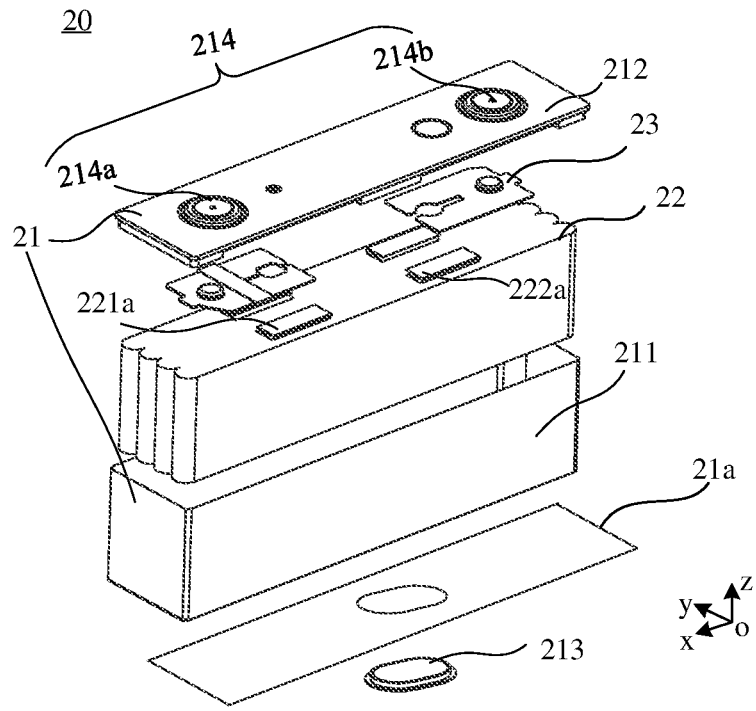
FIG. 4 is an exploded view of a battery cell disclosed in an embodiment of the present application.

FIG. 4 is a schematic structural diagram of a battery cell 20 according to an embodiment of the present application. The battery cell 20 includes one or more electrode assemblies 22, a housing 211 and a cover plate 212. The housing 211 and the cover plate 212 form a shell 21. A wall of the housing 211 and the cover plate 212 are both referred to as a wall of the battery cell 20. The housing 211 is shaped according to the combined shape of the one or more electrode assemblies 22. For example, the housing 211 may be a hollow cuboid or cube or cylinder, and one surface of the housing 211 has an opening, so that the one or more electrode assemblies 22 may be placed in the housing 211. For example, when the housing 211 is a hollow cuboid or cube, one plane of the housing 211 is an opening surface, that is, the plane does not have a wall, so that the inside and outside of the housing 211 are in communication with each other. When the housing 211 is a hollow cylinder, an end surface of the housing 211 is an opening surface, that is, the end surface does not have a wall, so that the inside and outside of the housing 211 are in communication with each other. The cover plate 212 covers the opening and is connected to the housing 211 to form a closed cavity in which the electrode assemblies 22 are placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in the shape of a flat plate, the two electrode terminals 214 are fixed on the flat plate face of the cover plate 212, and the two electrode terminals 214 are a first electrode terminal 214a and a second electrode terminal 214b, respectively. Polarities of the two electrode terminals 214 are opposite. For example, when the first electrode terminal 214a is a positive electrode terminal, the second electrode terminal 214b is a negative electrode terminal. Each electrode terminal 214 is correspondingly provided with a connecting member 23, which is located between the cover plate 212 and the electrode assembly 22 and configured to electrically connect the electrode assembly 22 to the electrode terminal 214.

As shown in FIG. 4, each electrode assembly 22 has a first tab 221a and a second tab 222a. The first tab 221a and the second tab 222a have opposite polarities. For example, when the first tab 221a is a positive tab, the second tab 222a is a negative tab. The first tab 221a of the one or more electrode assemblies 22 is connected to one electrode terminal through one connecting member 23, and the second tab 222a of the one or more electrode assemblies 22 is connected to the other electrode terminal through the other connecting member 23. For example, the first electrode terminal 214a having a positive polarity is connected to the positive tab through one connecting member 23, and the second electrode terminal 214b having a negative polarity is connected to the negative tab through the other connecting member 23.

In the battery cell 20, according to actual usage demands, the electrode assembly 22 may be set to be single or multiple in number. As shown in FIG. 4, four independent electrode assemblies 22 are disposed in the battery cell 20.

A pressure relief mechanism 213 may be further disposed on one wall of the battery cell 20. As shown in FIG. 4, a pressure relief mechanism 213 is disposed on a first wall 21a of the battery cell 20. The first wall 21a in FIG. 4 is separated from the housing 211, that is, a bottom side of the housing 211 has an opening, the first wall 21a covers the opening at the bottom side and is connected to the housing 211, and the connection manner may be welding or connecting with an adhesive. Alternatively, the first wall 21a and the housing 211 may also be an integral structure. The pressure relief mechanism 213 is configured to be actuated when an internal pressure or temperature of the battery cell 20 reaches a threshold, to relieve the internal pressure or temperature.

The pressure relief mechanism 213 may be a part of the first wall 21a, or may be a separate structure from the first wall 21a, and is fixed to the first wall 21a by means of welding, for example. When the pressure relief mechanism 213 is a part of the first wall 21a, for example, the pressure relief mechanism 213 may be formed by setting an indentation on the first wall 21a, and a thickness of the first wall 21a corresponding to the indentation is smaller than a thickness of another region of the pressure relief mechanism 213 other than the indentation. The indentation is the weakest position of the pressure relief mechanism 213. When excessive gas generated by the battery cell 20 causes an internal pressure of the housing 211 to rise and reach a threshold, or heat generated by internal reaction of the battery cell 20 causes an internal temperature of the battery cell 20 to rise and reach a threshold, the pressure relief mechanism 213 may be fractured at the indentation, resulting in the communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 4, in a case where the pressure relief mechanism 213 is disposed at the first wall 21a of the battery cell 20, a second wall of the battery cell 20 is provided with electrode terminals 214, and the second wall is different from the first wall 21a.

Optionally, the second wall is arranged opposite to the first wall 21a. For example, the first wall 21a may be a bottom wall of the battery cell 20, and the second wall may be the cover plate 212 of the battery cell 20.

The pressure relief mechanism 213 and the electrode terminals 214 are disposed on different walls of the battery cell 20, so that when the pressure relief mechanism 213 is actuated, emissions from the battery cell 20 can be farther away from the electrode terminals 214, thereby reducing the impact of the emissions on the electrode terminals 214 and the bus component and therefore enhancing the safety of the battery 10.

Further, when the electrode terminals 214 are disposed on the cover plate 212 of the battery cell 20, the pressure relief mechanism 213 is disposed on the bottom wall of the battery cell 20, so that when the pressure relief mechanism 213 is actuated, the emissions from the battery cell 20 are discharged toward a bottom of the battery 10. In this way, on one hand, a risk of the emissions may be reduced by using a thermal management component at the bottom of the battery 10, and on the other hand, when the battery 10 is disposed in a vehicle, the bottom of the battery 10 is usually away from a passenger, thereby reducing harm to the passenger.

The pressure relief mechanism 213 may be in various possible pressure relief structures, which is not limited in the embodiments of the present application. For example, the pressure relief mechanism 213 may be a temperature-sensitive pressure relief mechanism, and the temperature-sensitive pressure relief mechanism is configured to be capable of being melted when an internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 5:
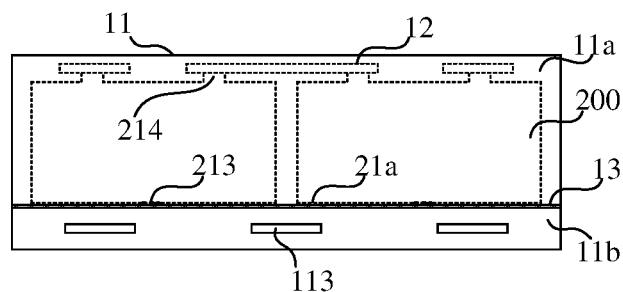
FIG. 5 is a cross-sectional view of a battery disclosed in an embodiment of the present application.

FIG. 5 is a schematic diagram of a box 11 of a battery 10 according to an embodiment of the present application. As shown in FIG. 5, the box 11 may include an electrical chamber 11a, a collection chamber 11b, and a thermal management component 13. Specifically, as shown in FIG. 5, the electrical chamber 11a and the collection chamber 11b are disposed on both sides of the thermal management component 13, and the thermal management component 13 is configured to separate the electrical chamber 11a and the collection chamber 11b; the electrical chamber 11a may be configured to accommodate a plurality of battery cells 20, a battery cell 20 including a pressure relief mechanism 213, and the pressure relief mechanism 213 being configured to be actuated when an internal pressure or temperature of the battery cell 20 reaches a threshold, to relieve the internal pressure; the thermal management component 13 is configured to accommodate a fluid to adjust the temperature of the battery cell 20; and the collection chamber 11b is configured to collect emissions discharged from the battery cell 20 and passing through the thermal management component 13 when the pressure relief mechanism 213 is actuated. In addition, as shown in FIG. 5, a first pressure relief zone 113 is disposed on a wall of the collection chamber 11b, and the first pressure relief zone 113 is configured to relieve the emissions in the collection chamber 11b.

Therefore, in the box 11 of the battery 10 in the embodiment of the present application, the first pressure relief zone 113 is disposed on the wall of the collection chamber 11b, so that when the pressure relief mechanism 213 is actuated, the emissions discharged by the battery cell 20 through the pressure relief mechanism 213 can be discharged in time through the first pressure relief zone 113 on the wall of the collection chamber 11b after entering the collection chamber 11b, to relieve the pressure and temperature in the collection chamber 11b, and also to prevent the battery 10 from exploding when the emissions accumulate in the collection chamber 11b and cannot be discharged.

It should be understood that the box 11 of the battery 10 shown in FIG. 5 in the embodiment of the present application may correspond to the box 11 of the battery 10 shown in FIGS. 1 to 4, and is applied to the related description. For the sake of brevity, description will not repeated here.

The thermal management component 13 in the embodiment of the present application is configured to isolate the electrical chamber 11a and the collection chamber 11b. The so-called "isolation" here refers to separation, which may refer to unsealing.

The electrical chamber 11a in the embodiment of the present application is configured to accommodate a plurality of battery cells 20, and may also be configured to accommodate a bus component 12. That is, the electrical chamber 11a provides an accommodating space for the battery cells 20 and the bus component 12, and a structure for fixing the battery cells 20 may also be disposed in the electrical chamber 11a.

The bus component 12 is configured to implement electric connection between the plurality of battery cells 20. The bus component 12 may implement the electrical connection between the battery cells 20 by connecting electrode terminals 214 of the battery cells 20.

At least one battery cell 20 of the plurality of battery cells 20 may include a pressure relief mechanism 213. The pressure relief mechanism 213 is configured to be actuated when an internal pressure or temperature of the battery cell 20 provided with the pressure relief mechanism 213 reaches a threshold, to relieve the internal pressure or temperature.

For convenience of illustration, the battery cell 20 involved in the following description about the pressure relief mechanism 213 refers to a battery cell 20 provided with a pressure relief mechanism 213. For example, the battery cell 20 may be the battery cell 20 in FIG. 4.

Optionally, in an embodiment of the present application, the thermal management component 13 is configured to isolate the electrical chamber 11a and the collection chamber 11b, that is, the electrical chamber 11a that accommodates the plurality of battery cells 20 and the bus component 12 and the collection chamber 11b that collects emissions are disposed separately, and the thermal management component 13 has a wall shared by the electrical chamber 11a and the collection chamber 11b. As shown in FIG. 5, the thermal management component 13 may be both a wall of the electrical chamber 11a and a wall of the collection chamber 11b. That is, the thermal management component 13 (or a part thereof) may be regarded as a wall shared by the electrical chamber 11a and the collection chamber 11b. In this way, the emissions from the battery cells 20 may enter the collection chamber 11b through the thermal management component 13. Meanwhile, due to the presence of the thermal management component 13, the emissions may be isolated from the electrical chamber 11a as far as possible, thus reducing the risk of the emissions and enhancing the safety of the battery 10.

Figure 6:
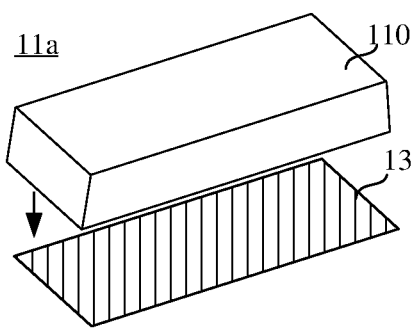
FIG. 6 is an exploded view of an electrical chamber disclosed in an embodiment of the present application.

Optionally, in an embodiment of the present application, the box 11 may further include a covering 110, and the covering 110 may be a hollow structure with an opening at one end, and the electrical chamber 11a may be composed of the covering 110 with the opening and the thermal management component 13. For example, FIG. 6 shows an exploded view of an electrical chamber 11a according to an embodiment of the present application. As shown in FIG. 6, the electrical chamber 11a of the box 11 may include a covering 110 with an opening at one end (for example, an opening at the lower side in FIG. 6). The covering 110 with the opening is a semi-closed chamber with an opening in communication with the outside, and the thermal management component 13 covers the opening to form a chamber, i.e., the electrical chamber 11a.

Figure 7:
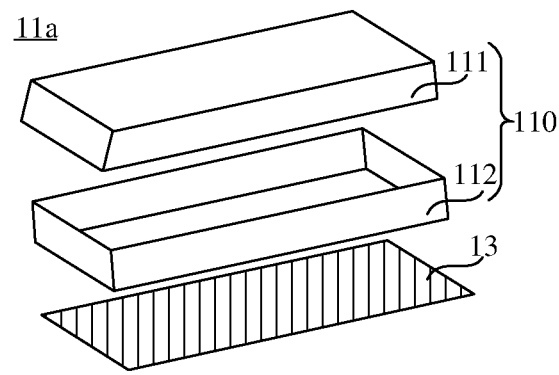
FIG. 7 is another exploded view of an electrical chamber disclosed in an embodiment of the present application.

Optionally, the covering 110 may also be composed of multiple parts. For example, FIG. 7 shows another exploded view of an electrical chamber 11a according to an embodiment of the present application. The embodiment of FIG. 7 may be obtained through improvement on the basis of FIG. 2. Specifically, the box 11 shown in FIG. 2 can be regarded as the electrical chamber 11a, that is, the covering 110 forming the electrical chamber 11a includes a first portion 111 and a second portion 112. It only requires to replace a bottom wall of the second portion 112 in FIG. 2 with a thermal management component 13, and use the thermal management component 13 as one wall of the electrical chamber 11a, thus forming the electrical chamber 11a in FIG. 7. In other words, when the bottom wall of the second portion 112 in FIG. 2 is removed, that is, an annular wall with openings on two sides is formed, the first portion 111 and the thermal management component 13 cover the openings on the two sides of the second portion 112 respectively to form a chamber, namely, the electrical chamber 11a.

Figure 8:
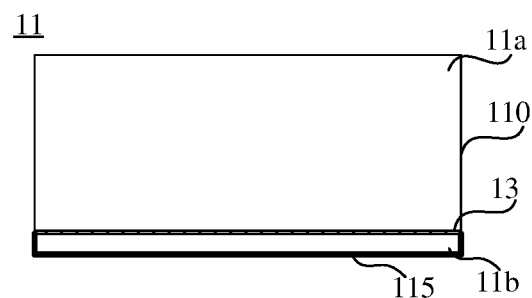
FIG. 8 is a schematic structural diagram of a box of a battery disclosed in an embodiment of the present application.
Figure 9:
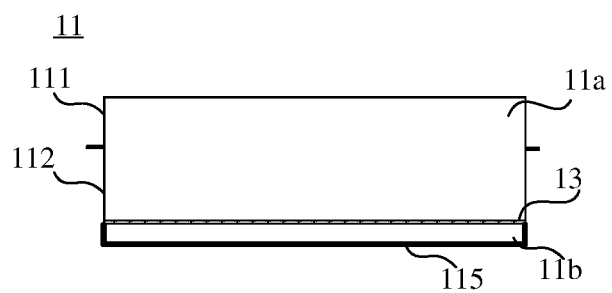
FIG. 9 is another schematic structural diagram of a box of a battery disclosed in an embodiment of the present application.

Optionally, in an embodiment of the present application, the collection chamber 11b may be composed of the thermal management component 13 and a protective member 115. For example, FIG. 8 shows a schematic diagram of a box 11 according to an embodiment of the present application, where an electrical chamber 11a in FIG. 8 is the electrical chamber 11a shown in FIG. 6; and FIG. 9 shows another schematic diagram of a box 11 according to an embodiment of the present application, where an electrical chamber 11a in FIG. 9 is the electrical chamber 11a shown in FIG. 7. As shown in FIG. 8 and FIG. 9, the box 11 further includes a protective member 115. The protective member 115 is configured to protect the thermal management component 13, and the protective member 115 and the thermal management component 13 form the collection chamber 11b.

The collection chamber 11b formed by the protective member 115 and the thermal management component 13 does not occupy the space that may accommodate the battery cells 20. Therefore, the collection chamber 11b with a larger space therein can be configured, which may effectively collect and buffer the emissions and reduce the risk resulting therefrom.

Optionally, in an embodiment of the present application, the collection chamber 11b may be further provided with a fluid, such as a cooling medium, or a component for accommodating the fluid, so as to further reduce the temperature of the emissions entering the collection chamber 11b. However, the fluid disposed in the collection chamber 11b does not affect the first pressure relief zone 113 disposed on the wall of the collection chamber 11b to discharge the emissions.

Optionally, in an embodiment of the present application, the collection chamber 11b may be a sealed chamber. For example, a connection between the protective member 115 and the thermal management component 13 may be sealed by a sealing member.

Optionally, in an embodiment of the present application, the collection chamber 11b may not be a sealed chamber. For example, the first pressure relief zone 113 of the collection chamber 11b may be unsealed, so that the collection chamber 11b can communicate with the outside air, and as a result, a part of the emissions can be directly discharged to the outside of the box 11.

In the foregoing embodiments, the thermal management component 13 covers the opening of the covering 110 to form the electrical chamber 11a, and the thermal management component 13 and the protective member 115 form the collection chamber 11b. Optionally, the thermal management component 13 may also directly separate the closed box 11 into an electrical chamber 11a and a collection chamber 11b without an additional protective member 115.

Figure 10:
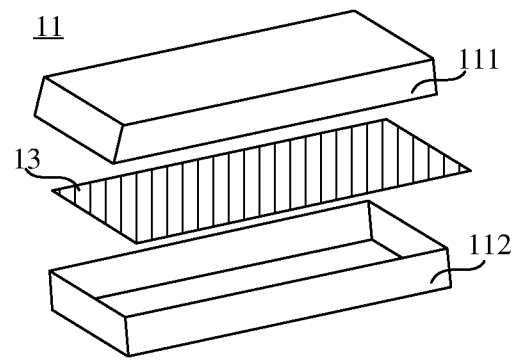
FIG. 10 is an exploded view of another box of a battery disclosed in an embodiment of the present application.

For example, in an embodiment of the present application, FIG. 10 shows an exploded view of a box 11 of a battery 10 according to another embodiment of the present application, and the box 11 in FIG. 10 may correspond to the box 11 shown in FIG. 2. As shown in FIG. 10, the box 11 may include a first portion 111, a second portion 112 and a thermal management component 13, and the first portion 111, the second portion 112 and the thermal management component 13 can form an electrical chamber 11a and a collection chamber 11b. Specifically, the first portion 111 and the second portion 112 shown in FIG. 10 each are a cavity structure with an opening on one side, and can respectively form a semi-closed structure. The thermal management component 13 may be disposed inside the second portion 112, and the first portion 111 covers the opening of the second portion 112. In other words, the thermal management component 13 may be first disposed in the semi-closed second portion 112 to isolate the collection chamber 11b, and then the first portion 111 covers the opening of the second portion 112 to form the electrical chamber 11a. In this way, by comparing FIG. 10 and FIG. 9, it can be seen that a bottom wall of the second portion 112 can replace the protective member 115 to form the collection chamber 11b.

For convenience of illustration, description is made as follows by an example that the thermal management component 13 and the protective member 115 constitute the collection chamber 11b, but it is also applicable to other situations, and the embodiment of the present application is not limited thereto.

Figure 11:
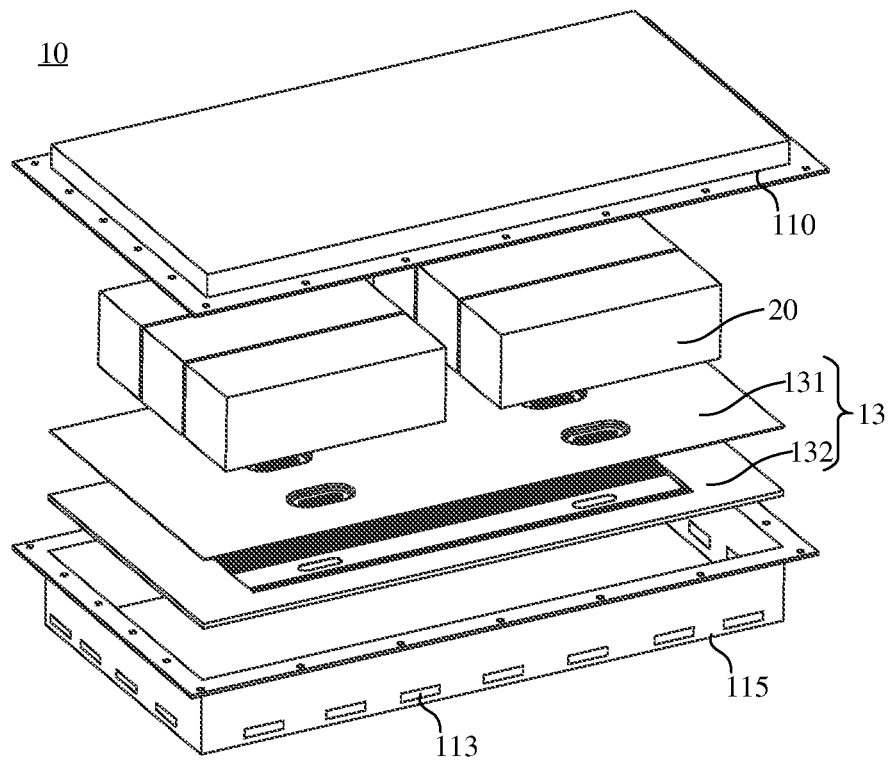
FIG. 11 is another exploded view of a battery disclosed in an embodiment of the present application.

Specifically, FIG. 11 shows an exploded view of a battery 10 according to an embodiment of the present application. As shown in FIG. 11, the battery 10 includes a covering 110, a thermal management component 13, a protective member 115, and a plurality of battery cells 20, where the covering 110 and the thermal management component 13 constitute an electrical chamber 11a for accommodating the battery cells 20; the thermal management component 13 and the protective member 115 form a collection chamber 11b, so that when a pressure relief mechanism 213 of the battery cell 20 is actuated, emissions discharged from the battery cell 20 pass through the thermal management component 13 and enter the collection chamber 11b; and a first pressure relief zone 113 on the collection chamber 11b discharges the emissions.

Optionally, the first pressure relief zone 113 in the embodiment of the present application may be disposed on any one or more walls of the collection chamber 11b. For example, the first pressure relief zone 113 may be disposed on the thermal management component 13, so that when the pressure relief mechanism 213 is actuated, the emissions discharged from the battery cell 20 are discharged to the collection chamber 11b through the thermal management component 13, and then discharged through the first pressure relief zone 113 disposed on the thermal management component 13 to prevent the battery 10 from exploding due to excessive air pressure or high temperature in the collection chamber 11b.

Figure 12:
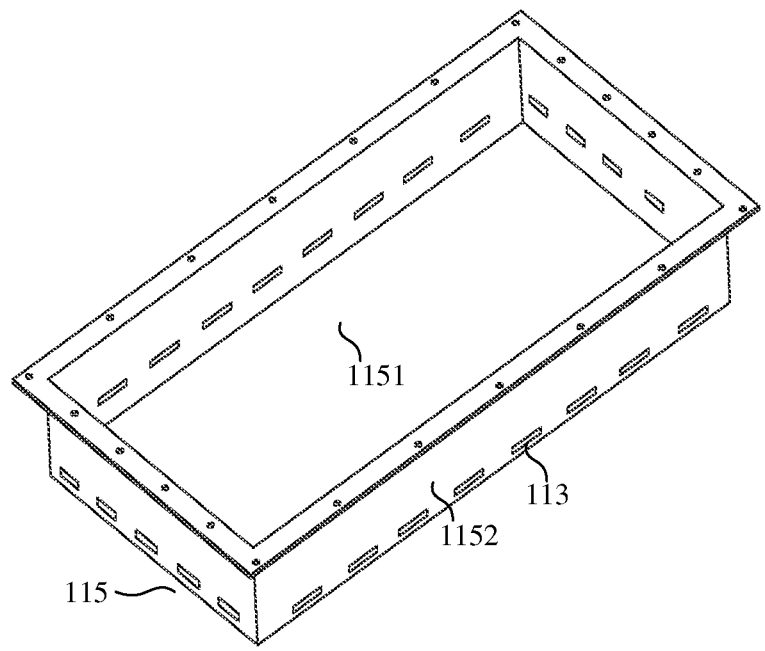
FIG. 12 is a schematic diagram of a protective member disclosed in an embodiment of the present application.
Figure 13:
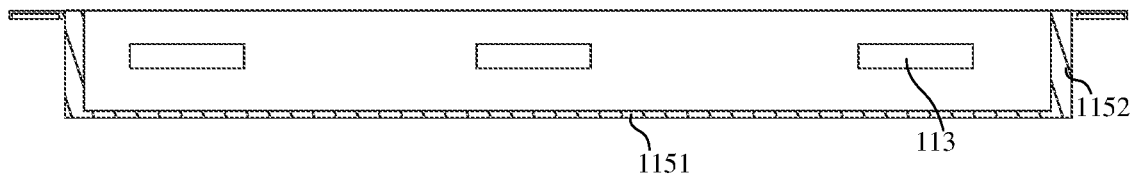
FIG. 13 is another schematic cross-sectional view of a protective member disclosed in an embodiment of the present application.

Optionally, the first pressure relief zone 113 in the embodiment of the present application may also be disposed on other walls of the collection chamber 11b, for example, it may also be disposed on the protective member 115. Specifically, FIG. 12 shows a schematic diagram of a protective member 115 according to an embodiment of the present application, and FIG. 13 shows another cross-sectional view of a protective member 115 according to an embodiment of the present application. As shown in FIGS. 11 to 13, the protective member 115 in the embodiment of the present application includes a bottom wall 1151 and a plurality of side walls 1152 to form a hollow structure with an opening at one end, and the thermal management component 13 covers the opening to form the collection chamber 11b.

Optionally, the first pressure relief zone 113 may be disposed on the bottom wall 1151 and/or the plurality of side walls 1152 of the protective member 115. Considering that if the first pressure relief zone 113 is disposed on the bottom wall 1151 of the protective member 115, the bottom wall 1151 of the protective member 115 is relatively weak at the first pressure relief zone 113, then during the use of the battery 10, it may affect the structural strength of the battery 10 and the collision safety performance of the battery 10. Therefore, as shown in FIGS. 11 to 13, the first pressure relief zone 113 is usually disposed on the plurality of side walls 1152.

In addition, the number of first pressure relief zones 113 and the area and shape of each first pressure relief zone 113 in the embodiment of the present application can be set according to actual applications. If the number of the first pressure relief zones 113 is set to be large, and the area of each first pressure relief zone 113 is set to be large, the structural strength of the protective member 115 will be affected, however, if the number of the first pressure relief zones 113 is set to be small, and the area of each first pressure relief zone 113 is set to be small, the discharge of emissions will be affected. Therefore, the number of the first pressure relief zones 113 and the area of each first pressure relief zone 113 can be set reasonably according to the size and strength requirements of the protective member 115. In addition, the shape of each first pressure relief zone 113 can also be flexibly set, and the shapes of the plurality of first pressure relief zones 113 can also be the same or different. For example, in order to facilitate processing, all the first pressure relief zones 113 may be set to the same shape, such as a rectangle shown in FIGS. 11 to 13, but the embodiment of the present application is not limited thereto.

Optionally, as shown in FIGS. 11 to 13, the first pressure relief zone 113 may be disposed on one or more side walls 1152 of the plurality of side walls 1152, and one or more first pressure relief zones 113 may be disposed on each side wall 1152. In addition, if a plurality of first pressure relief zones 113 are disposed on each side wall 1152, the plurality of first pressure relief zones 113 can be uniformly arranged on each side wall 1152, so that the protective member 115 receives uniform force, and the structural strength of the protective member 115 is ensured.

It should be understood that the first pressure relief zone 113 in the embodiment of the present application may be implemented in a variety of ways. Optionally, the first pressure relief zone 113 may be a through hole. For example, the protective member 115 is provided with at least one first through hole, and the first pressure relief zone 113 includes the first through hole. Optionally, the first pressure relief zone 113 may also be a weakened zone on the protective member 115. For example, at least one first weakened zone is disposed on the protective member 115, and the first weakened zone is capable of being damaged by the emissions in the collection chamber 11b when the pressure relief mechanism 213 is actuated, so that the emissions are discharged from the collection chamber 11b. The first pressure relief zone 113 includes the first weakened zone.

Optionally, the first weakened zone in the embodiment of the present application may be a groove on the protective member 115, and a bottom wall of the groove has a thickness smaller than a thickness of another region on the protective member 115, thereby forming the first weakened zone. Optionally, an opening of the groove may face the inside of the collection chamber 11b or the outside of the collection chamber 11b; and the groove may include an indentation on the protective member 115. Of course, it can be understood that the first weakened zone is also directly an indentation on the protective member 115.

Optionally, the first weakened zone in the embodiment of the present application may also be a region where a temperature-sensitive material is located, that is, a material of the first weakened zone is a temperature-sensitive material, and the temperature-sensitive material is used to be melted when a temperature reaches a threshold, that is, a melting point of the material of the first weakened zone is set to be lower than a melting point of a material of another region on the protective member 115 other than the first weakened zone, so that the first weakened zone made of the temperature-sensitive material can be melted when the temperature of the emissions reaches a certain value. Specifically, the material of the first weakened zone can be selected reasonably according to the temperature of the emissions discharged when the battery cell 20 suffers from thermal runaway. For example, considering the thermal runaway of the battery cell 20, the discharged emissions can usually reach a temperature between 400° C. and 800° C., and after passing through the thermal management component 13, due to the cooling effect of the thermal management component 13, the high-temperature emissions can reach a temperature between 200° C. to 400° C. when reaching the protective member 115. In order to make the first weakened zone melted, the melting point of the material of the first weakened zone may be set to be less than or equal to 200° C. For example, the material of the first weakened zone may be a tin alloy material, or may also be a polypropylene engineering plastic material, so that when the temperature reaches 200° C., the first weakened zone can be melted immediately, and further, the emissions can be smoothly discharged from the collection chamber 11b through the melted region.

Compared with adopting a weak groove or indentation to set the first weakened zone, choosing a temperature-sensitive material to set the first weakened zone can ensure the mechanical strength of the first weakened zone, and ensure the collision safety performance of the box 11 during the use of the battery 10; and the use of temperature-sensitive material to set the first weakened zone can implement when the gas pressure in the collection chamber 11b is insufficient, the first weakened zone can be melted quickly only by the temperature change in the collection chamber 11b. Compared with the groove or indentation that requires gas to accumulate to a certain pressure and be damaged, the use of temperature-sensitive material to set the first weakened zone can discharge the emissions more timely, and enhance the safety of the battery 10 in use.

In order to ensure the structural strength of the protective member 115, a thickness of the first weakened zone made of the temperature-sensitive material is usually selected to be consistent with a thickness of another region. For example, when the first weakened zone is disposed on the plurality of side walls 1152, wall thicknesses of the plurality of side walls 1152 at the first weakened zone are equal to wall thicknesses of the plurality of side walls 1152 at another region.

Figure 14:
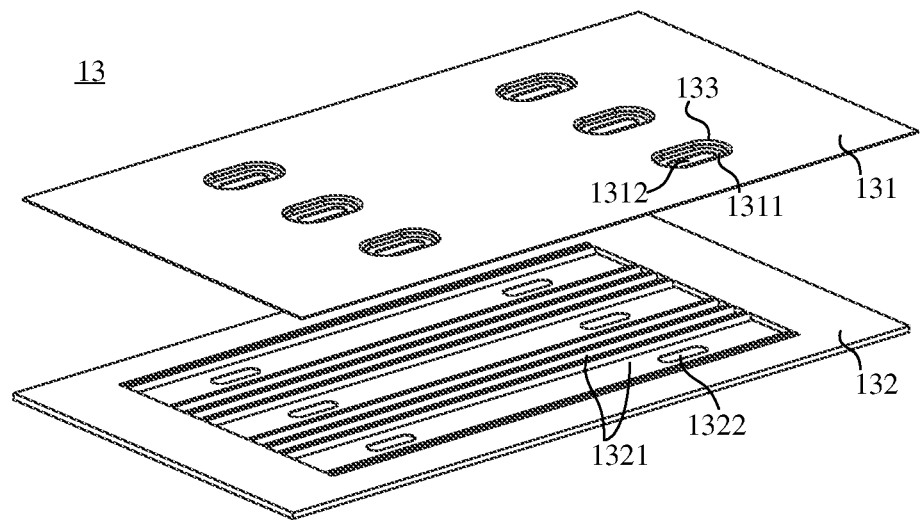
FIG. 14 is an exploded view of a thermal management component disclosed in an embodiment of the present application.
Figure 15:
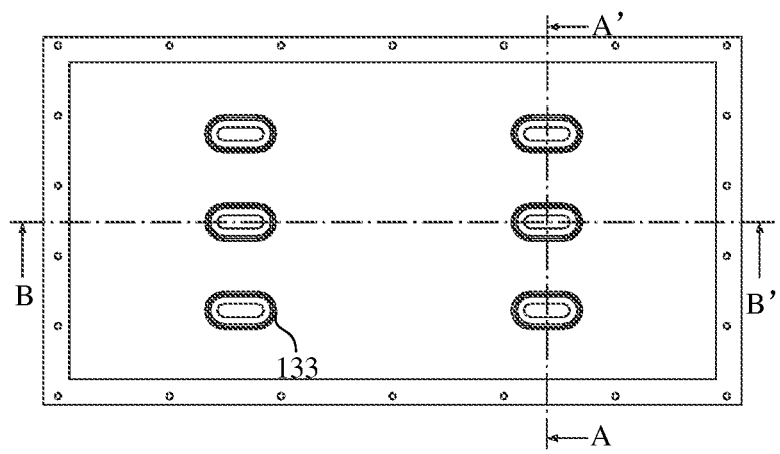
FIG. 15 is a top view of a thermal management component and a protective member after installation disclosed in an embodiment of the present application.
Figure 16:
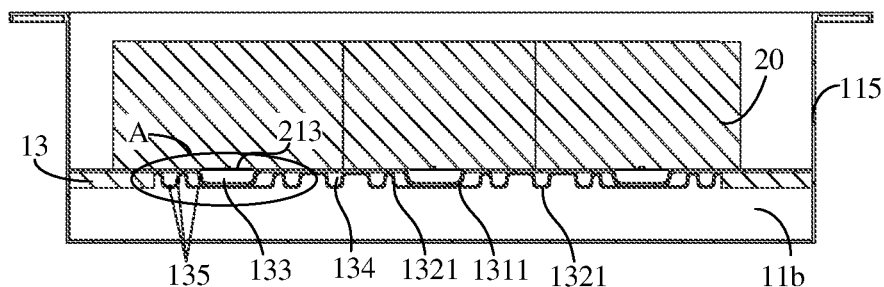
FIG. 16 is a schematic cross-sectional view of a thermal management component and a protective member disclosed in an embodiment of the present application.
Figure 17:
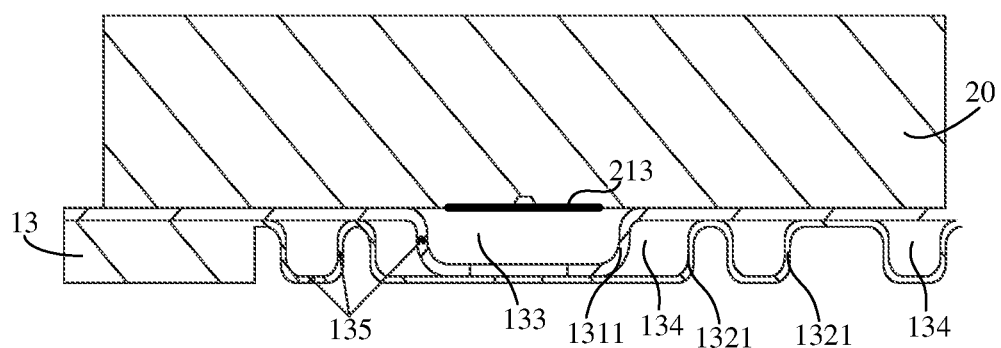
FIG. 17 is a partial enlarged view of a cross-section of a thermal management component and a protective member disclosed in an embodiment of the present application.
Figure 18:
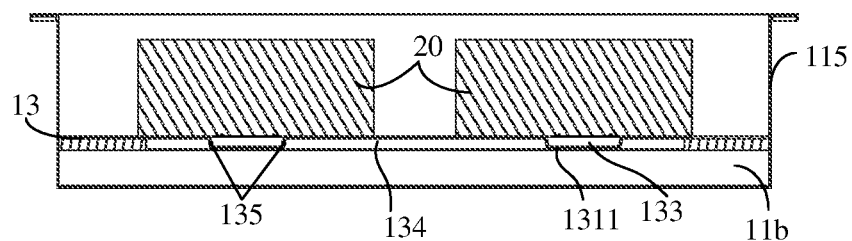
FIG. 18 is another schematic cross-sectional view of a thermal management component and a protective member disclosed in an embodiment of the present application.

FIG. 14 shows an exploded view of a thermal management component 13 according to an embodiment of the present application, FIG. 15 shows a top view of a thermal management component 13 and a protective member 115 after installation according to an embodiment of the present application, FIG. 16 is a schematic cross-sectional view of a thermal management component 13 and a protective member 115 after installation along an A-A' direction shown in FIG. 15; FIG. 17 is a partial enlarged view of a region A in FIG. 16; and FIG. 18 is a schematic cross-sectional view of a thermal management component 13 and a protective member 115 after installation along a B-B' direction shown in FIG. 15.

As shown in FIGS. 14 to 18, the thermal management component 13 in the embodiment of the present application is provided with a flow channel 134, which is configured to accommodate a fluid, and the flow channel 134 may be damaged by the emissions discharged from the battery cell 20 when the pressure relief mechanism 213 is actuated, so that the fluid is discharged from the inside of the flow channel 134; the thermal management component 13 may also be provided with a second pressure relief zone 133, so that when the pressure relief mechanism 213 is actuated, the emissions discharged from the battery cell 20 is capable of passing through the second pressure relief zone 133 and being discharged to the collection chamber 11b.

The second pressure relief zone 133 in the embodiment of the present application can be set according to the position and size of the pressure relief mechanism 213. For example, in order to enable the emissions to pass through the second pressure relief zone 133 smoothly to be discharged to the collection chamber 11b when the pressure relief mechanism 213 is actuated, the second pressure relief zone 133 may be arranged opposite to the pressure relief mechanism 213, or an area of the second pressure relief zone 133 may also be set to be larger than an area of the pressure relief mechanism 213. In addition, the shape of the second pressure relief zone 133 may also be set according to the shape and area of the pressure relief mechanism 213. For example, in the embodiment of the present application, description is made by an example that the shape of the second pressure relief zone 133 and the shape of the pressure relief mechanism 213 are the same, and both are in a racetrack shape shown in FIG. 14 and FIG. 15, but the embodiment of the present application is not limited thereto.

The size, position, and shape of the flow channel 134 in the embodiment of the present application can be set according to actual applications. As shown in FIGS. 14 to 18, the flow channel 134 in the embodiment of the present application may be configured as a long strip. In order to enable the emissions discharged from the battery cell 20 to pass through the second pressure relief zone 133 and damage the flow channel 134 when the pressure relief mechanism 213 is actuated, so that the fluid is discharged from the flow channel 134 to reduce the temperature of the emissions, the flow channel 134 may be disposed around the second pressure relief zone 133, and cross-sectional shapes or sizes of the flow channel 134 at different positions may be the same or different, but the embodiment of the present application is not limited thereto.

As shown in FIGS. 14 to 18, the thermal management component 13 in the embodiment of the present application may include a first thermally conductive plate 131 and a second thermally conductive plate 132. With reference to FIGS. 5, 11, and 14 to 18, the first thermally conductive plate 131 is located between a first wall 21a where the pressure relief mechanism 213 is located and the second thermally conductive plate 132, and the first thermally conductive plate 131 is attached to the first wall 21a, and the first thermally conductive plate 131 is adhered to the second thermally conductive plate 132. The second thermally conductive plate 132 has a first groove 1321 with an opening facing the first thermally conductive plate 131, and the first groove 1321 and the first thermally conductive plate 131 form the flow channel 134. The size of one or more first grooves 1321 disposed on the second thermally conductive plate 132 may be the same or different, and the embodiment of the present application is not limited thereto.

It should be understood that in the embodiment of the present application, that the first thermally conductive plate 131 is attached to the first wall 21a of the battery cell 20 may include the first thermally conductive plate 131 directly contacts the first wall 21a, or may include the first thermally conductive plate 131 is connected to the first wall 21a through a thermally conductive adhesive or other substances to realize the heat exchange between the first thermally conductive plate 131 and the first wall 21a of the battery cell 20.

Optionally, in the embodiment of the present application, a second weakened zone 135 may be disposed on a wall of the flow channel 134, so that when the pressure relief mechanism 213 is actuated, the flow channel 134 is more likely to be damaged, that is, the flow channel 134 can be damaged at the second weakened zone 135, and the fluid in the flow channel 134 flows out to reduce the temperature of the emissions.

Optionally, the second weakened zone 135 may be implemented in a variety of ways. For example, the second weakened zone 135 may be an indentation on the wall of the flow channel 134; or, the second weakened zone 135 may also be made of a temperature-sensitive material, that is, a melting point of a material of the second weakened zone 135 is lower than a melting point of a material of another region on the flow channel 134 other than the second weakened zone 135, so that the second weakened zone 135 can be melted when the temperature reaches a certain value. Specifically, the material of the second weakened zone 135 can be selected according to the temperature of the emissions discharged from the battery cell 20. For example, considering that when the battery cell 20 suffers from thermal runaway, the discharged emissions can usually reach a temperature between 400° C. and 800° C., the material of the second weakened zone 135 can thus be selected from a material with a melting point less than or equal to 400° C. In this way, when contacting the second weakened zone 135, the emissions can melt the second weakened zone 135 and cause the second weakened zone 135 to be damaged. For example, the second weakened zone 135 may be made of a tin alloy material, or may also be made of a polypropylene engineering plastic material.

Considering the strength of the flow channel 134 on the thermal management component 13, a wall thickness of the flow channel 134 at the second weakened zone 135 is usually set to be equal to a wall thickness of the flow channel 134 at another region, so as to prevent the second weakened zone 135 from being damaged in advance when the battery cell 20 does not suffer from thermal runaway during the use of the battery 10. For example, the second weakened zone 135 may be made of a tin alloy material, and the remaining region of the flow channel 134 may be made of an aluminum material. The thicknesses of the two can be set to be the same, and they can be connected by welding or structural glue, but the embodiment of the present application is not limited thereto.

Compared with configuring the second weakened zone 135 by an indentation, adopting a temperature-sensitive material to configure the second weakened zone 135 can ensure the structural strength of the flow channel 134, and ensures the structural strength of the thermal management component 13 as well, so that during the normal use of the battery 10, the second weakened zone 135 is not easy to be damaged; and when the second weakened zone 135 is configured by a groove, air pressure acting on the surface of the second weakened zone 135 needs to be large enough. The temperature-sensitive material is adopted to configure the second weakened zone 135 to induce the temperature change when the gas pressure is insufficient, so that the second weakened zone 135 is quickly melted. Compared with the groove that requires gas accumulation to be damaged, the temperature-sensitive material is adopted to configure the second weakened zone 135 so that the flow channel 134 can be damaged in a more timely manner, thereby realizing the timeliness of reducing the temperature of the battery cell 20 that suffers from thermal runaway, and enhancing the safety of the battery 10.

Considering that when the battery cell 20 suffers from thermal runaway, the discharged emissions will first pass through the thermal management component 13 and then reach the collection chamber 11b, that is, the emissions will damage the second weakened zone 135 first, the melting point of the material of the second weakened zone 135 can thus be set to be larger, which can not only ensure the strength of the flow channel 134, but also enable the second weakened zone 135 to be melted when the emissions contact the second weakened zone 135, so that the fluid in the flow channel 134 can be discharged to reduce the temperature of the battery cell 20 that suffers from thermal runaway, the emissions as well as the box 11, and when the emissions with reduced temperature enter the collection chamber 11b, the temperature has already dropped. Therefore, the melting point of the material of the second weakened zone 135 can be set to be smaller than the melting point of the material of the first weakened zone that the first pressure relief zone 113 includes, so that the emissions with reduced temperature can melt the material of the first pressure relief zone 113 and the emissions are discharged from the collection chamber 11b.

Optionally, the shape and area of the second weakened zone 135 in the embodiment of the present application may be set according to actual applications. For example, the area of the second weakened zone 135 should not be set to be too large, because the second weakened zone 135 with a large area will cause the flow channel 134 to be excessively weak, and the mechanical strength of the flow channel 134 cannot be guaranteed; and when the pressure relief mechanism 213 is actuated, if the second weakened zone 135 with the large area is damaged, it will cause a waste of fluid in the flow channel 134.

Optionally, the position of the second weakened zone 135 in the embodiment of the present application may be set according to actual applications, and the second weakened zone 135 may be set at any one or more positions of the flow channel 134. For example, when the pressure relief mechanism 213 is actuated, the emissions of the battery cell 20 can be discharged to the collection chamber 11b through the second pressure relief zone 133 of the thermal management component 13. Therefore, the position of the second weakened zone 135 can be set according to the second pressure relief zone 133 so that the emissions passing through the second pressure relief zone 133 can damage the second weakened zone 135; in addition, the position of the second weakened zone 135 can also be reasonably set according to the position of the flow channel 134. Examples will be described below with reference to the accompanying drawings.

Optionally, the second pressure relief zone 133 in the embodiment of the present application may be a through hole on the thermal management component 13. For example, the thermal management component 13 may be provided with a second through hole penetrating the first thermally conductive plate 131 and the second thermally conductive plate 132, and the second pressure relief zone 133 is the second through hole. In addition, a side wall of the second through hole may be a wall of the flow channel 134, and the second weakened zone 135 may be disposed on the side wall of the second through hole, so that the emissions of the battery cell 20 can damage the second weakened zone 135 on the hole wall when passing through the second through hole, and further, the fluid in the flow channel 134 can flow out smoothly.

Optionally, the second pressure relief zone 133 in the embodiment of the present application may also be a second groove 1311 on the thermal management component 13. Specifically, the second pressure relief zone 133 is a second groove 1311 on the thermal management component 13 arranged opposite to the pressure relief mechanism 213, and a bottom wall of the second groove 1311 is configured to be damaged by the emissions discharged from the battery cell 20 when the pressure relief mechanism 213 is actuated, so that the emissions discharged from the battery cell 20 are discharged to the collection chamber 11b. Optionally, an opening of the second groove 1311 may face the pressure relief mechanism 213 or may also face away from the pressure relief mechanism 213.

If a side wall of the second groove 1311 is a wall of the flow channel 134, the second weakened zone 135 can also be disposed on the side wall of the second groove 1311. For convenience of illustration, description will be made as follows by taking FIGS. 14 to 18 as examples. As shown in FIGS. 14 to 18, in an example that the opening of the second groove 1311 faces the pressure relief mechanism 213, the second groove 1311 in the embodiment of the present application can be implemented by the first thermally conductive plate 131 of the thermal management component 13, that is, the first thermally conductive plate 131 is recessed toward the second thermally conductive plate 132 in the second pressure relief zone 133, so as to form the second groove 1311. In this way, there is a gap between the pressure relief mechanism 213 and the bottom wall of the second groove 1311, which can provide deformation space for the pressure relief mechanism 213 to ensure that the pressure relief mechanism 213 can be smoothly opened when the battery cell 20 suffers from thermal runaway, so as to improve the safety of the battery 10.

Optionally, a size of the second groove 1311 can be set according to actual applications. For example, as shown in FIGS. 14 to 18, a radial size of the second groove 1311 in the embodiment of the present application gradually decreases in a direction away from the pressure relief mechanism 213. Such a change in a hole diameter of the second groove 1311 can increase an area of a hole wall of the second groove 1311, which also increases a contact area between the emissions discharged from the battery cell 20 through the pressure relief mechanism 213 and the hole wall of the second groove 1311, and can reduce the temperature of more emissions; in addition, more emissions contact the hole wall of the second groove 1311, which can also enable the hole wall of the second groove 1311 to be more easily damaged by the emissions, especially when the hole wall of the second groove 1311 serves as the wall of the flow channel 134, the side wall of the second groove 1311 is damaged, so that the internal fluid can flow out quickly and reduce the temperature of the emissions. It can be understood that, in other embodiments, the radial size of the second groove 1311 may also remain unchanged in the direction away from the pressure relief mechanism 213.

Optionally, the second pressure relief zone 133 in the embodiment of the present application may also be a combination of the through hole and the groove. For example, still taking FIG. 14 as an example, a third through hole 1312 is disposed on the bottom wall of the second groove 1311, and correspondingly, a fourth through hole 1322 is disposed on the second thermally conductive plate 132, so that the second pressure relief zone 133 can be formed, and the embodiment of the present application is not limited thereto.

Alternatively, other methods may be further included to use the groove and the through hole to form the second pressure relief zone 133. For example, a third through hole 1312 is disposed on the bottom wall of the second groove 1311, but an cross-sectional area of the third through hole 1312 is smaller than an area of the bottom wall of the second groove 1311, and correspondingly, a fourth through hole 1322 is not disposed on the second thermally conductive plate 132, and by connecting a non-through hole region on the bottom wall of the second groove 1311 with the second thermally conductive plate 132, the second pressure relief zone 133 can be formed; or, no third through hole 1312 is disposed on the bottom wall of the second groove 1311, and correspondingly, a fourth through hole 1322 is disposed on the second thermally conductive plate 132, but an cross-sectional area of the fourth through hole 1322 is smaller than an area of the bottom wall of the second groove 1311, and by connecting the bottom wall of the second groove 1311 with a region around the fourth through hole 1322 on the second thermally conductive plate 132, the second pressure relief zone 133 can also be formed, and the embodiment of the present application is not limited thereto.

Optionally, as shown in FIGS. 14 to 18, the second groove 1311 in the embodiment of the present application may be disposed in the first groove 1321, so that the flow channel 134 is formed between the side wall of the first groove 1321 and the side wall of the second groove 1311; correspondingly, a second weakened zone 135 may be disposed on the side wall of the second groove 1311, and the emissions can damage the second weakened zone 135 on the side wall of the second groove 1311 while damaging the second pressure relief zone 133, so as to allow the fluid in the flow channel 134 to flow out and directly spray to the battery cell 20 suffering from thermal runaway, thereby directly realizing the effect of reducing the temperature of the battery cell 20 suffering from the thermal runaway.

Optionally, the second weakened zone 135 may also be located at other positions of the flow channel 134. For example, as shown in FIG. 14 and FIG. 17, for the flow channel 134 formed by the first groove 1321 and a region of the first thermally conductive plate 131 on which the second groove 1311 is not disposed, the second weakened zone 135 may also be located on the side wall or the bottom wall of the first groove 1321 forming the flow channel 134. Optionally, the second weakened zone 135 disposed on the side wall or bottom wall of the first groove 1321 is usually made of a temperature-sensitive material. Considering that when the emissions discharged from the battery cell 20 enter the collection chamber 11b, air pressure may be insufficient, but the temperature may still be high, the use of the temperature-sensitive material to configure the second weakened zone 135 can thus cause the emissions to quickly damage the wall of the flow channel 134 through the second weakened zone 135 disposed on the side wall or bottom wall of the first groove 1321, so that the fluid in the flow channel 134 flows directly into the collection chamber 11b, thereby further reducing the temperature of the protective member 115, and indirectly realizing the effect of reducing the temperature of the battery cell 20 suffering from the thermal runaway.

Therefore, a battery 10 in the embodiment of the present application includes an electrical chamber 11a and a collection chamber 11b. The electrical chamber 11a and the collection chamber 11b are respectively disposed on both sides of a thermal management component 13. When a battery cell 20 suffers from thermal runaway, a pressure relief mechanism 213 is actuated, discharged emissions can enter the collection chamber 11b through the thermal management component 13, and the emissions can be discharged out of the collection chamber 11b through a first pressure relief zone 113 disposed on the collection chamber 11b to relieve pressure and temperature inside the collection chamber 11b, thereby improving the safety of the battery 10 during use. In addition, a second weakened zone 135 may also be disposed on the thermal management component 13, for example, the second weakened zone 135 may be disposed on a flow channel 134, and the emissions discharged from the battery cell 20 through the pressure relief mechanism 213 can damage the second weakened zone 135, so that a fluid in the flow channel 134 can flow out to reduce the temperature of the battery cell 20, or reduce the temperature of the collection chamber 11b and the emissions in the collection chamber 11b, so as to further reduce the possibility of explosion of the battery 10.

The box 11 of the battery 10, the battery 10 and the power consumption device according to the embodiments of the present application are described above, and a method and apparatus for producing a box of a battery according to embodiments of the present application will be described below. For the parts not described in detail, reference can be made to the foregoing embodiments.

Figure 19:
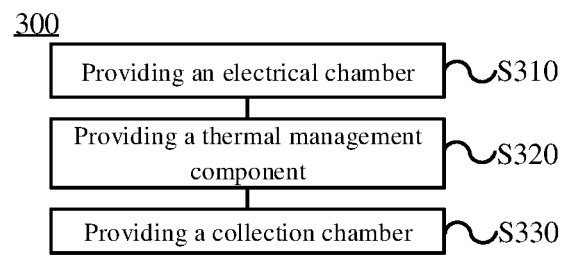
FIG. 19 is a schematic flowchart of a method for producing a box of a battery disclosed in an embodiment of the present application.

FIG. 19 shows a schematic flowchart of a method 300 for producing a box of a battery according to an embodiment of the present application. As shown in FIG. 19, the method 300 may include: S310, providing an electrical chamber, the electrical chamber being configured to accommodate a plurality of battery cells, a battery cell including a pressure relief mechanism, and the pressure relief mechanism being configured to be actuated when an internal pressure or temperature of the battery cell reaches a threshold, to relieve the internal pressure; S320, providing a thermal management component, the thermal management component being configured to accommodate a fluid to adjust the temperature of the battery cell; and S330, providing a collection chamber, the collection chamber being configured to collect emissions discharged from the battery cell and passing through the thermal management component when the pressure relief mechanism is actuated, where the electrical chamber and the collection chamber are disposed on both sides of the thermal management component, the thermal management component is configured to separate the electrical chamber and the collection chamber, a wall of the collection chamber is provided with a first pressure relief zone, and the first pressure relief zone is configured to relieve the emissions in the collection chamber.

Figure 20:
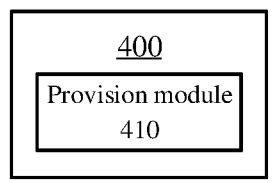
FIG. 20 is a schematic block diagram of an apparatus for producing a box of a battery disclosed in an embodiment of the present application.

FIG. 20 shows a schematic block diagram of an apparatus 400 for producing a box of a battery according to an embodiment of the present application. As shown in FIG. 20, the apparatus 400 may include: a provision module 410. The provision module 410 is configured to provide an electrical chamber, the electrical chamber being configured to accommodate a plurality of battery cells, a battery cell including a pressure relief mechanism, and the pressure relief mechanism being configured to be actuated when an internal pressure or temperature of the battery cell reaches a threshold, to relieve the internal pressure; provide a thermal management component, the thermal management component being configured to accommodate a fluid to adjust the temperature of the battery cell; and provide a collection chamber, the collection chamber being configured to collect emissions discharged from the battery cell and passing through the thermal management component when the pressure relief mechanism is actuated, where the electrical chamber and the collection chamber are disposed on both sides of the thermal management component, the thermal management component is configured to separate the electrical chamber and the collection chamber, a wall of the collection chamber is provided with a first pressure relief zone, and the first pressure relief zone is configured to relieve the emissions in the collection chamber.

Although the present application has already been described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A box of a battery, comprising:
an electrical chamber, configured to accommodate a plurality of battery cells, a battery cell comprising a pressure relief mechanism, and the pressure relief mechanism being configured to be actuated when an internal pressure or temperature of the battery cell reaches a threshold, to relieve the internal pressure;
a thermal management component, the thermal management component comprising a first thermally conductive plate and a second thermally conductive plate, the first thermally conductive plate being located between a first wall and the second thermally conductive plate and attaching to the first wall, the first wall being a wall of the battery cell provided with the pressure relief mechanism, the first thermally conductive plate being adhered to the second thermally conductive plate, the second thermally conductive plate having a first groove with an opening facing the first thermally conductive plate, the first groove and the first thermally conductive plate forming a flow channel, wherein the flow channel is configured to accommodate a fluid to adjust the temperature of the battery cell; and a collection chamber, configured to collect emissions when the pressure relief mechanism is actuated, the emissions being discharged from the battery cell and passing through the thermal management component, wherein the electrical chamber and the collection chamber are disposed on either side of the thermal management component, the thermal management component is configured to separate the electrical chamber and the collection chamber, a wall of the collection chamber is provided with a first pressure relief zone, and the first pressure relief zone is configured to relieve the emissions in the collection chamber.

2. The box according to claim 1, wherein the thermal management component has a wall shared by the electrical chamber and the collection chamber.

3. The box according to claim 1, wherein the box comprises:

a protective member, wherein the protective member is configured to protect the thermal management component, and the protective member and the thermal management component form the collection chamber.

4. The box according to claim 3, wherein the protective member comprises a bottom wall and a plurality of side walls to form a hollow structure with an opening at one end, and the thermal management component is configured to cover the opening to form the collection chamber.

5. The box according to claim 4, wherein the first pressure relief zone is disposed on the plurality of side walls.

6. The box according to claim 5, wherein a plurality of the first pressure relief zones are disposed on each side wall of the plurality of side walls.

7. The box according to claim 6, wherein the plurality of the first pressure relief zones are uniformly arranged on the each side wall.

8. The box according to claim 4, wherein a first through hole is disposed on the protective member, and the first pressure relief zone comprises the first through hole.

9. The box according to claim 4, wherein a first weakened zone is disposed on the protective member, the first weakened zone is configured to be damaged by the emissions in the collection chamber when the pressure relief mechanism is actuated, so that the emissions are discharged from the collection chamber, and the first pressure relief zone comprises the first weakened zone.

10. The box according to claim 9, wherein a melting point of a material of the first weakened zone is lower than a melting point of a material of another region on the protective member other than the first weakened zone.

11. The box according to claim 9, wherein the first weakened zone is disposed on the plurality of side walls, and wall thicknesses of the plurality of side walls at the first weakened zone are equal to wall thicknesses of the plurality of side walls at another region.

12. The box according to claim 1, wherein a second pressure relief zone is disposed on the thermal management component so that when the pressure relief mechanism is actuated, the emissions discharged from the battery cell are configured to pass through the second pressure relief zone and be discharged to the collection chamber.

13. The box according to claim 12, wherein the second pressure relief zone is arranged opposite to the pressure relief mechanism.

14. The box according to claim 1, wherein the flow channel is configured to be damaged by the emissions discharged from the battery cell when the pressure relief mechanism is actuated, so that the fluid is discharged from the inside of the flow channel.

15. The box according to claim 14, wherein a second weakened zone is disposed on a wall of the flow channel, so that when the pressure relief mechanism is actuated, the flow channel is damaged at the second weakened zone.

16. The box according to claim 1, wherein the second weakened zone is located on a side wall or a bottom wall of the first groove.

17. The box according to claim 15, wherein the second pressure relief zone is a second through hole on the thermal management component.

18. A battery, comprising:

a plurality of battery cells, at least one battery cell of the plurality of battery cells comprising a pressure relief mechanism, and the pressure relief mechanism being configured to be actuated when an internal pressure or temperature of the battery cell provided with the pressure relief mechanism reaches a threshold, to relieve the internal pressure; and the box of the battery according to claim 1, the box being configured to accommodate the plurality of battery cells.

19. A power consumption device, comprising: the battery according to claim 18, the battery being configured to provide electrical energy for the power consumption device.

* * * * *